US012534602B2

(12) United States Patent
Lam et al.

(10) Patent No.: US 12,534,602 B2
(45) Date of Patent: Jan. 27, 2026

(54) POLYETHYLENE HOMOPOLYMER COMPOSITIONS WITH BALANCED PROPERTIES

(71) Applicant: NOVA CHEMICALS (INTERNATIONAL) S.A., Fribourg (CH)

(72) Inventors: Patrick Lam, Calgary (CA); Monika Kleczek, Calgary (CA); Eric Vignola, Airdrie (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 582 days.

(21) Appl. No.: 17/923,267

(22) PCT Filed: Apr. 30, 2021

(86) PCT No.: PCT/IB2021/053624
§ 371 (c)(1),
(2) Date: Nov. 4, 2022

(87) PCT Pub. No.: WO2021/229354
PCT Pub. Date: Nov. 18, 2021

(65) Prior Publication Data
US 2023/0235153 A1  Jul. 27, 2023

Related U.S. Application Data

(60) Provisional application No. 63/023,270, filed on May 12, 2020.

(51) Int. Cl.
*C08L 23/06* (2006.01)
*C08F 2/06* (2006.01)
*C08F 110/02* (2006.01)
*C08K 5/1539* (2006.01)

(52) U.S. Cl.
CPC ............... *C08L 23/06* (2013.01); *C08F 2/06* (2013.01); *C08F 110/02* (2013.01); *C08K 5/1539* (2013.01); *C08L 2203/16* (2013.01)

(58) Field of Classification Search
CPC ..... C08L 23/04; C08L 23/06; C08L 2205/025
See application file for complete search history.

(56) References Cited

U.S. PATENT DOCUMENTS

| | | | |
|---|---|---|---|
| 5,342,868 A | 8/1994 | Kimura et al. | |
| 5,981,636 A | 11/1999 | Amos et al. | |
| 6,372,864 B1 | 4/2002 | Brown | |
| 6,419,966 B1 | 7/2002 | Davis | |
| 6,465,551 B1 | 10/2002 | Zhao et al. | |
| 6,599,971 B2 | 7/2003 | Dotson et al. | |
| 6,689,847 B2 | 2/2004 | Mawson et al. | |
| 7,737,220 B2 | 6/2010 | Swabey et al. | |
| 8,076,421 B2 | 12/2011 | Kapur et al. | |
| 9,587,093 B2 | 3/2017 | Aubee et al. | |
| 9,644,087 B2 | 5/2017 | Aubee et al. | |
| 9,850,369 B2 | 12/2017 | Aubee et al. | |
| 10,066,093 B2 | 9/2018 | Aubee et al. | |
| 2003/0088021 A1 | 5/2003 | Van Dun et al. | |
| 2011/0143155 A1 | 6/2011 | Aubee et al. | |
| 2014/0309351 A1 | 10/2014 | Lightbody et al. | |
| 2017/0190889 A1 | 7/2017 | Wang | |
| 2022/0056248 A1* | 2/2022 | Wang | C08L 23/06 |
| 2024/0209193 A1 | 6/2024 | Williamson et al. | |

FOREIGN PATENT DOCUMENTS

| | | | | |
|---|---|---|---|---|
| EP | 2402391 A1 * | 1/2012 | ......... | B29C 45/0001 |
| WO | WO-2019/180166 A1 | 9/2019 | | |

OTHER PUBLICATIONS

ASTM D1003-13, Standard Test Method for Haze and Luminous Transmittance of Transparent Plastics, Nov. 15, 2013, 7 pages.
ASTM D1238-13, Standard Test Method for Melt Flow Rates of Thermoplastics by Extrusion Plastometer, Aug. 1, 2013, 16 pages.
ASTM D1505-18, Standard Test Method for Density of Plastics by the Density-Gradient Technique, Apr. 1, 2018, 7 pages.
ASTM D1822-13, Standard Test Method for Water Vapor Transmission Rate Through Plastic Film and Sheeting Using a Modulated Infrared Sensor, Sep. 1, 2013, 11 pages.
ASTM D2457-13, Standard Test Method for Specular Gloss of Plastic Films and Solid Plastics, Apr. 1, 2013, 6 pages.
ASTM D6474-99, Standard Test Method for Determining Molecular Weight Distribution and Molecular Weight Averages of Polyolefins by High Temperature Gel Permeation Chromatography, Mar. 15, 2006, 6 pages.
ASTM D792-13, Standard Test Methods for Density and Specific Gravity (Relative Density) of Plastics by Displacement, Nov. 1, 2013, 6 pages.
ASTM F1249-90, Standard Test Method for Water Vapor Transmission Rate Through Plastic Film and Sheeting Using a Modulated Infrared Sensor, Jul. 27, 1990, 5 pages.
International Search Report and Written Opinion mailed Sep. 22, 2021 in corresponding international application PCT/IB2021/053624, 9 pages.
Randall, J.C., A Review of High Resolution Liquid 13-Carbon Nuclear Magnetic Resonance Characterizations of Ethylene-Based Polymers, Rev. Macromol. Chem. Phys. C29 (2 and 3), pp. 201-202, 285-286 (1989).

* cited by examiner

*Primary Examiner* — Jeffrey S Lenihan
(74) *Attorney, Agent, or Firm* — Thomas J. Styslinger

(57) ABSTRACT

A polyethylene homopolymer composition having a weight average molecular weight Mw, of from 75,000 to 95,000; an Mz of from 200,000 to 325,000; a molecular weight distribution Mw/Mn of from 6 to 12 and a melt index, $I_2$ of from 1.5 to 2.8 grams per 10 minutes can be used to prepare films having a good balance of optical properties and resistance to moisture transmission.

15 Claims, No Drawings

POLYETHYLENE HOMOPOLYMER COMPOSITIONS WITH BALANCED PROPERTIES

CROSS-REFERENCE TO RELATED APPLICATIONS

This application is a U.S. National Phase Application under 35 U.S.C. § 371 of International Application No. PCT/IB2021/053624, filed Apr. 30, 2021, which claims priority to and the benefit of U.S. Provisional Application No. 63/023,270, filed May 12, 2020, both of which are hereby incorporated by reference in their entireties.

TECHNICAL FIELD

A polyethylene homopolymer composition may be used to prepare films having a good balance of optical properties and barrier properties.

BACKGROUND ART

Polyethylene homopolymer that is prepared with a peroxide initiator in a high-pressure polymerization process is a widely available item of commerce that is commonly referred to as high pressure/low density polyethylene (or "HPLD"). Such HPLD generally contains a significant amount of long chain branching (or "LCB"). The presence of the LCB reduces the density of the homopolymer polyethylene. In addition, the presence of the LCB modifies the melt rheology of the polyethylene in a manner which is desirable for many fabrication processes—especially the production of blown film. Films made from HPLD typically exhibit very good optical properties (high gloss and low haze) but poor "barrier" properties (i.e. these films are comparatively permeable to moisture). It is also generally accepted that the presence of LCB can reduce some physical properties of the polyethylene in comparison to a "linear" polyethylene homopolymer having the same melt index.

It is also known to produce "linear" ethylene homopolymers by the homopolymerization of ethylene with a coordination catalyst (such as a Ziegler Natta or "Z/N" catalyst). The resulting ethylene homopolymers are essentially free of LCB when prepared with a Z/N catalyst. These linear ethylene homopolymers have sharp melting points, which makes them suitable for some injection molding applications. In addition, plastic film which is prepared from linear ethylene homopolymer has high resistance to moisture transmission (or, alternatively stated, a low water vapor transmission rate or low "WVTR").

SUMMARY OF INVENTION

In an embodiment, there is provided a polyethylene composition that includes at least two ethylene homopolymer blend components, where the composition has:
  (i) a density of from 0.96 to 0.97 g/cc;
  (ii) an Mw of from 75,000 to 90,000;
  (iii) an Mn of from 7000 to 12,000;
  (iv) an Mz of from 200,000 to 325,000;
  (v) a molecular weight distribution, Mw/Mn of from 6 to 12;
  (vii) a melt index, $I_2$, as determined by ASTM D1238 at 190° C., using a 2.16 kilogram load, of from 1.5 to 2.8 grams per 10 minutes; and further characterized in that;
  (viii) from 25-55 weight % of the composition has a molecular weight of less than or equal to 20,000;
wherein the composition includes a first blend component containing 45 to 60 weight % of the composition and a second blend component containing from 55 to 40 weight % of the composition, where the first blend component has:
  A1) an Mw/Mn of from 1.8 to 2.5; and
  A2) a melt index, $I_2$, as determined by ASTM D1238 at 190° C., using a 2.16 kilogram load, of from 3,000 to 25,000 grams per 10 minutes; and,
wherein the second blend component has:
  B1) an Mw/Mn of from 1.8 to 2.5; and
  B2) a melt index, $I_2$, as determined by ASTM D1238 at 190° C., using a 2.16 kilogram load, of from 0.05 to 0.5 grams per 10 minutes.

In an embodiment, there is provided a polyethylene composition that includes at least two ethylene homopolymer blend components, where the composition has:
  (i) a density of from 0.96 to 0.97 g/cc;
  (ii) an Mw of from 75,000 to 90,000;
  (iii) an Mn of from 7000 to 12,000;
  (iv) an Mz of from 200,000 to 325,000;
  (v) a molecular weight distribution, Mw/Mn of from 6 to 12;
  (vii) a melt index, $I_2$, as determined by ASTM D1238 at 190° C., using a 2.16 kilogram load, of from 1.5 to 2.8 grams per 10 minutes; and further characterized in that;
  (viii) from 25-55 weight % of the composition has a molecular weight of less than or equal to 20,000,
wherein the composition includes a first blend component containing 45 to 60 weight % of the composition and a second blend component containing from 55 to 40 weight % of the composition, where the first blend component has:
  A1) an Mw/Mn of from 1.8 to 2.5; and
  A2) a melt index, $I_2$, as determined by ASTM D1238 at 190° C., using a 2.16 kilogram load, of from 3,000 to 8,500 grams per 10 minutes; and
wherein the second blend component has:
  B1) an Mw/Mn of from 1.8 to 2.5; and
  B2) a melt index, $I_2$, as determined by ASTM D1238 at 190° C., using a 2.16 kilogram load, of from 0.05 to 0.5 grams per 10 minutes.

In an embodiment, the Mz of the polyethylene composition is less than or equal to 300,000.

In an embodiment, the Mn of the polyethylene composition is less than or equal to 10,000.

In an embodiment, the polyethylene composition comprises a nucleating agent.

In an embodiment, the polyethylene composition comprises a nucleating agent comprising a calcium salt of hexahydrophthalic acid.

In an embodiment, a film prepared from the polyethylene composition provides a good balance of optical properties (good gloss and low haze) and barrier properties (low water vapor transmission rate, WVTR).

An embodiment is a film made from the polyethylene composition having a haze of less than 30%.

In an embodiment, there is provided a process to prepare a polyethylene composition that includes at least two ethylene homopolymer blend components, said process comprising contacting at least one single site polymerization catalyst system with ethylene under polymerization conditions for said ethylene in at least two polymerization reactors, including a first polymerization reactor and a second polymerization reactor, and blending together the polyethylene produced in each polymerization reactor, wherein hydrogen is added to said first polymerization reactor so as to provide a concentration of from 0.5 to 2 ppm in said first polymerization reactor and wherein hydrogen is added to second polymerization reactor so as to provide a hydrogen concentration of from 35 to 55 ppm in said second polymerization reactor.

DESCRIPTION OF EMBODIMENTS

The polyethylene homopolymer compositions of this disclosure are made from at least two ethylene "homopolymer" blend components. As used herein, the term "homopolymer" is meant to convey a conventional meaning—i.e. the polymer is prepared with substantially only ethylene monomer (though it will be recognized by those skilled in the art that very minor amounts—less than 1%—of higher alpha olefins may be present in a conventional "homopolymer" as a result of contamination of the ethylene stream and/or the polymerization medium).

In an embodiment, the present compositions contain at least one homopolymer blend component which has a very high melt index (also referred to as "$I_2$") of from 3,000 to 25,000 grams per 10 minutes.

In an embodiment, the present compositions contain at least one homopolymer blend component which has a very high melt index (also referred to as "$I_2$") of from 3,000 to 8,500 grams per 10 minutes.

In an embodiment, the overall polyethylene composition will have:
  (i) a density of from 0.96 to 0.97 g/cc;
  (ii) an Mw of from 75,000 to 95,000;
  (iii) an Mn of less than or equal to 12,000 (or in another embodiment, less than or equal to 10,000);
  (iv) an Mz of from 200,000 to 325,000 (or in another embodiment, less than or equal to 300,000);
  (v) an Mw/Mn of from 6 to 12;
  (vi) an $I_2$, as determined by ASTM D1238 at 190° C., using a 2.16 kilogram load, of from 1.5 to 2.8 grams per 10 minutes; and
  (vii) a molecular weight distribution such that from 25 to 55 weight % (or in other embodiments greater than 30 weight %) of the composition has a molecular weight of less than 20,000 (i.e. when the molecular weight distribution of the homopolymer composition is plotted as a conventional "molecular weight versus mass fraction" plot, the cumulative weight % of the composition of this invention is such that at least 25 weight % and up to 55 weight % has a molecular weight of less than 20,000).

In an embodiment, the overall polyethylene composition will have:
  (i) a density of from 0.96 to 0.97 g/cc;
  (ii) an Mw of from 75,000 to 95,000;
  (iii) an Mn of less than or equal to 12,000 (or in another embodiment, less than or equal to 10,000);
  (iv) an Mz of from 200,000 to 325,000 (in in another embodiment, less than or equal to 300,000);
  (v) an Mw/Mn of from 6 to 12;
  (vi) an $I_2$, as determined by ASTM D1238 at 190° C., using a 2.16 kilogram load, of from 1.5 to 2.8 grams per 10 minutes; and
  (vii) a molecular weight distribution such that from 25 to 45 weight % (or in other embodiments greater than 30 weight %) of the composition has a molecular weight of less than 20,000 (i.e. when the molecular weight distribution of the homopolymer composition is plotted as a conventional "molecular weight versus mass fraction" plot, the cumulative weight % of the composition of this invention is such that at least 25 weight % and up to 45 weight % has a molecular weight of less than 20,000).

In an embodiment, the composition is essentially free of any polyethylene having a molecular weight of greater than 900,000 (for greater certainty, less than 1 weight % has a molecular weight of greater than 900,000).

In an embodiment the polyethylene composition has a number average molecular weight, Mn of from 7,000 to 10,000.

In an embodiment the polyethylene composition has a Z-average molecular weight, Mw of from 200,000 to 300,000.

In an embodiments, at least 25 weight %, or at least 30 weight %, or at least 35 weight %, or at least 40 weight % of the polyethylene composition has a molecular weight of less than 20,000.

In an embodiments, at least 99 weight % of the polyethylene composition has a molecular weight of less than 900,000.

Both homopolymer blend components will often also have a narrow molecular weight distribution (Mw/Mn of 2.5 or less).

In an embodiment of the disclosure, the polyethylene composition comprises at least two ethylene homopolymer blend components: a first blend component containing 45 to 60 weight % of the polyethylene composition and a second blend component containing from 55 to 40 weight % of the polyethylene composition.

In an embodiment, the first blend component has a lower weight average molecular weight, Mw than the second blend component.

In an embodiment, the first blend component has a higher melt index, I2 (as determined by ASTM D1238 at 190° C., using a 2.16 kilogram load) than the second blend component.

In an embodiment of the disclosure, the first blend component has a Mw/Mn of from 1.8 to 2.5.

In an embodiment of the disclosure, the first blend component has a a melt index, $I_2$, as determined by ASTM D1238 at 190° C., using a 2.16 kilogram load, of from 3,000 to 25,000 grams per 10 minutes, or from 3,000 to 20,000 grams per 10 minutes, or from 3,000 to 15,000 grams per 10 minutes, or from 3,000 to 10,000 grams per 10 minutes, or from 3,000 to 8500 grams per 10 minutes.

In an embodiment of the disclosure, the second blend component has a Mw/Mn of from 1.8 to 2.5.

In an embodiment of the disclosure, the second blend component has a melt index, $I_2$, as determined by ASTM D1238 at 190° C., using a 2.16 kilogram load, of from 0.05 to 0.5 grams per 10 minutes.

The present compositions may be used to prepare films having a good balance of optical properties and barrier properties, as will be illustrated in the Examples.

While not wishing to be bound by theory, it is believed that:

1) the good optical properties of films made from these compositions are a result of the Mz being controlled to a value of less than or equal to 325,000 (especially less than or equal to 300,000);

2) the excellent barrier properties (low WVTR) of the films is a result of a combination of: (i) the low molecular weight of the first blend component (i.e. at least 25 weight % of the blend has an absolute molecular weight of less than 20,000); the Mn of the composition is low (less than or equal to 12,000, especially less than or equal to 10,000); (ii) both blend components having a molecular weight distribution (Mw/Mn) of less than or equal to 2.5; and (iii) the large difference in the molecular weight of the blend components—with the result being that the molecular weight distribution of the composition is from 6 to 12.

The homopolymer compositions of this disclosure may generally be used to prepare a wide variety of molded or extruded goods. However, they will often be used in films, especially blown films. Certain plastic films produced with the present compositions have a desirable balance of optical properties and barrier properties (or, alternatively state, low WVTR). Such films may be monolayer or multilayer. In multilayer films, the compositions may be suitably employed in at least one "skin layer" or, alternatively, in a "core layer" of a 3, 5 or 7-layer film. In an embodiment, the compositions are used in the core layer of a multilayer film with conventional HDPE resins (such as those prepared with a Zeigler Natta or chromium catalyst) being used in the skin layers. In an embodiment, a multilayer film may also contain a core layer made of ethylene-vinyl alcohol (EVOH) copolymer to further improve barrier properties.

The present compositions may be prepared by any conventional blending technique or alternatively, by the homopolymerization of ethylene in a multi reactor polymerization system. If the compositions are produced by a polymerization method, then a catalyst which is capable of producing polyethylene having a molecular weight distribution, Mw/Mn, of less or equal to than 2.5 is used in all polymerization reactors. The use of a dual reactor solution polymerization process using a "single site catalyst" is suitable and is illustrated in the Examples.

Multi reactor polymerization systems are well known to those skilled in the art. A description of the dual reactor solution polymerization system which is can be used in this disclosure is given in U.S. Pat. No. 6,372,864 (Brown).

The term "single site catalyst" is also well known to those skilled in the art and is used herein to convey its conventional meaning. In general, a single site catalyst will produce ethylene homopolymers having a narrow molecular weight distribution (i.e. Mw/Mn of less than or equal to 2.5) in a well-mixed polymerization reactor and will copolymerize ethylene with a higher alpha olefin (such as butene, hexene or octene) in a manner that produces a regular distribution of the comonomer within the copolymers.

Examples of single site catalyst systems include the following catalysts: metallocenes, constrained geometry catalysts, or phosphinimine catalysts when used in combination with a methylaluminoxane ("MAO") cocatalyst or a boron activator (such as a trityl or anilinium salt of tetrakis (pentafluorophenyl) boron).

Further descriptions of single site catalysts are provided in U.S. Pat. No. 6,689,847 (including the references therein).

Additional examples of "linear" ethylene homopolymers that have been produced with single site catalysts (such as "metallocene" catalysts or "constrained geometry" catalysts) are suggested in U.S. Pat. No. 6,419,966 (Davis). Similarly, a review of linear ethylene homopolymers prepared with "constrained geometry" catalysts is suggested in 2003/0088021 A1 (Van Dun '03). In addition, the Van Dun disclosure provides a review of resin blends which contain an ethylene homopolymer blend component having a molecular weight distribution of greater than 2.5 (i.e. a blend component which is not prepared with a single site catalyst). Van Dun specifically teaches that homopolymers derived from typical single site catalysts have the dual disadvantage of (a) being unable to attain as high a density for a given molecular weight as comparable Ziegler products; and (b) exhibiting a narrow Mw/Mn across the whole molecular weight range.

It should be noted that catalysts which do not readily produce long chain branching ("LCB") are generally used in this disclosure. This is because the presence of LCB may reduce the density and/or stiffness (as evidenced by lower modulus) of films made from the polyethylene homopolymer compositions of this disclosure.

LCB is determined using $^{13}$C nuclear magnetic resonance (NMR) and is quantified using the method defined by Randall (Rev. Macromol. Chem. Phys. C29 (2 and 3) p. 285-297). In an embodiment, the compositions of this disclosure contain less than 0.3 long chain branches per 100 carbon atoms, especially less than 0.1 long chain branches per 1,000 carbon atoms.

The use of a single site phosphinimine catalyst system in a dual reactor polymerization process to prepare compositions according to this disclosure is described in the following, non-limiting Examples.

Additives

HDPE is often sold with an additive package that contains a primary antioxidant (part 1, below) and a secondary antioxidant (part 3, below). The primary antioxidant may be used in an amount of from 200 to 2,000 ppm. Similarly, the secondary antioxidant may also be used in an amount of from 200 to 2,000 ppm. Other (optional) additives are also described below.

1. Primary Antioxidants 1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl)

terephthalate; and other phenolics such as monoacrylate esters of bisphenols such as ethylidiene bis-2,4-di-t-butylphenol monoacrylate ester.

2. UV Absorbers and Light Stabilizers 2.1 2-(2'-hydroxyphenyl)-benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-but yl-5'-tert-butyl-,4'-octoxy,3',5'-ditert-amyl-3',5'-bis-(alpha, alpha-di methylbenzyl)-derivatives.

2.2 2-Hydroxy-Benzophenones

For example, the 4-hydroxy-4-methoxy-,4-octoxy,4-decyloxy-,4dodecyloxy-,4-benzyloxy,4,2',4'-trihydroxy- and 2'-hydroxy-4,4'-dimethoxy derivative.

2.3 Sterically Hindered Amines

For example, bis (2,2,6,6-tetramethylpiperidyl)-sebacate; bis-5 (1,2,2,6,6-pentamethylpiperidyl)-sebacate; n-butyl-3, 5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone). These amines are typically called HALS (Hindered Amines Light Stabilizing) and include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2, 2,6,6-tetramethyl-piperidin-4-yl)-epsiloncaprolactam.

3. Secondary Antioxidants 3.1 Phosphites and Phosphonites

For example, triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl) phosphite; diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; and tetrakis(2,4-di-tert-butylphenyl)4,4'-biphenylene diphosphonite.

3.2 Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; and N,N-dialkylhydroxylamine derived from hydrogenated tallow amine. The analogous amine oxides are also suitable.

4. Slip Agents

For example, oleamide; erucamide; stearamide; behenamide.

5. Fillers, Antiblocks, and Reinforcing Agents

For example, calcium carbonate; diatomaceous earth; natural and synthetic silica; silicates; glass fibers; asbestos; talc; kaolin; mica; barium sulfate; metal oxides and hydroxides; carbon black; and graphite.

6. Miscellaneous Additives For example, plasticizers; epoxidized vegetable oils, such as epoxidized soybean oils; lubricants; emulsifiers; pigments; optical brighteners; flame-proofing agents; anti-static agents; anti-fog agents; blowing agents; and thiosynergists, such as dilaurythiodipropionate or distearylthiodipropionate.

7. Nucleating Agents

In an embodiment, the compositions of this disclosure are used to prepare films that contain a nucleating agent. Examples of nucleating agents which may be suitable include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophtalic acid structure (or "HHPA" structure) as disclosed in U.S. Pat. No. 6,599,971 (Dotson et al., to Milliken); zinc glycerolate; and phosphate esters, such as those disclosed in U.S. Pat. No. 5,342,868 and those sold under the trade names NA-11 and NA-21 by Asahi Denka Kogyo. In an embodiment, the nucleating agent is a cyclic dicarboxylate or a salt thereof, especially the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. In an embodiment, the nucleating agent is 1,2-cyclohexanedicarboxylic acid, calcium salt (CAS registry number 491589-22-1)—and—in an embodiment, this nucleating agent is added in an amount of from 200 to 2,000 ppm (especially from 500 to 1,500 ppm), based on the weight of the HDPE.

In the Examples, physical properties of the polymers were measured using the methods described below:

Melt index, $I_2$, measurements were made in accordance with ASTM D-1238 ("$I_2$" using a 2.16 kg load at 190° C. and "121" using a 21 kg load at 190° C.).

Density (g/cc) was measured in accordance with ASTM D792. Film density was measured according to ASTM D1505.

The haze of films was measured in accordance with ASTM D1003.

Film gloss was measured in accordance with ASTM D2457.

Mn, Mw and Mz (g/mol) were determined by Gel Permeation Chromatography and measured in accordance with ASTM D6474-99.

If the blend components are made as separate polymers, then the above described methods may be used to directly measure properties (such as melt index, density, Mn, Mw and Mw/Mn) of the blend components and the overall composition. However, if the composition is made in a multi-reactor process that produces an in-situ blend, then curve-fitting techniques may be used to deconvolute/estimate properties and amounts of the blend components in the overall composition. In general, this type of deconvolution is conducted by starting with the GPC chromatogram/curve for the overall resin, then using multiple Flory distributions to arrive at a "best fit" for the chromatogram/curve. This deconvolution technique is well known to those skilled in the art.

A technique to estimate the melt index of the low molecular weight blend component is described as follows. It will be recognized by those skilled in the art that melt index ($I_2$) is inversely proportional to molecular weight for polyethylene resins. This was confirmed for homopolymer HDPE resins having a narrow molecular weight distribution (of less than 3) by preparing a plot of log($I_2$) versus log (weight average molecular weight, Mw). In order to prepare this plot, the melt index ($I_2$) and weight average molecular Mw) of more than 15 different homopolymer HDPE resins was measured. These homopolymer HDPE resins had a narrow molecular weight distribution (less than 3) but had different Mw—ranging from about 30,000 to 150,000. (As will be appreciated by those skilled in the art, it is difficult to obtain reproducible I2 values for polyethylene resins having a molecular weight which is outside of this range).

A log/log plot of these I2 and Mw values was used to calculate the following relation between I2 and Mw for such homopolymer HDPE resins:

$$I_2 = (1.774 \times 10^{19}) \times (Mw^{-3.86}).$$

Extrapolation (based on the above relation) was used to estimate the I2 values of the low molecular weight fractions of inventive compositions shown in the examples. That is, Mw values were used to estimate the I2 values.

Water Vapor Transmission Rate ("WVT", expressed as grams of water vapor transmitted per 100 square inches of film per day at a specified film thickness (mils), or g/100 in²/day) was measured in accordance with ASTM F1249-90 with a MOCON permatron developed by Modern Controls Inc. at conditions of 100° F. (37.8° C.) and 100% relative humidity. Oxygen Transmission Rate (OTR, express as cubic centimeters of oxygen per 100 square inches of film per day at a specified film thickness (mils), or cc/100 in2/day) was measured using an instrument sold under the brand name MOCON OXTRA System, model 2/21T.

Polymerization conditions and polymer properties are shown in Table 1.

EXAMPLES

Polymerizations

These examples used a dual reactor solution polymerization process in which the contents of the first reactor flow into the second reactor. The use of the two reactors provides "in-situ" polymer blends. Both reactors were sufficiently agitated to provide well-mixed conditions. The volume of the first reactor was 12 liters and the volume of the second reactor was 24 liters. The first reactor was operated at a reactor pressure of about 13,000 kPa (about $2.0 \times 10^3$ psi). The second reactor was at sufficiently lower pressure to facilitate continuous flow from the first reactor to the second. The solvent used was methyl pentane. The process is continuous in all feed streams.

The catalyst used in all experiments was a titanium (IV) complex having one cyclopentadienyl ("Cp") ligand, two chloride ligands and one tri(tertiary butyl) phosphinimine ligand, namely: $CpTi(NP(^tBu)_3)Cl_2$. The catalyst concentration that was added to each reactor is shown in Table 1, expressed as parts per million (ppm) of Ti (based on the total weight of the reactor contents).

A boron co-catalyst (namely the triphenyl carbenium or "trityl" salt of tetrakis pentafluorophenyl boron) was used in an approximately stoichiometric amount (based on the titanium contained in the catalyst). A commercially available methylaluminoxane ("MMAO7", from Akzo Nobel) was also included in an Al/Ti ratio of about 40/1. 2,6-di-tertiary butyl hydroxy 4-ethylbenzene was added to the MAO to scavenge free trimethyl aluminum (TMA) in the MAO (in an Al/OH ratio of about 0.5 to 1, based on the Al contained in the TMA).

Hydrogen is added to the reactor as a chain transfer agent. In an embodiment, 0.5 to 2 parts per million by weight (ppm) of hydrogen are added to the first reactor and 35 to 55 ppm to the second reactor (based on the total weight of the reactor contents).

The term "ethylene split" refers to the fraction of the total ethylene that is directed to that reactor.

Other polymerization conditions and some properties of the resulting high-density polyethylene ("HDPE") compositions are shown in Table 1.

TABLE 1

Pilot Plant Process Conditions and Resin Parameters for a HDPE (targeting a melt index, $I_2$ = ca. 2)

| Pilot Plant 2 MI HDPE | Inventive 1 | Inventive 2 | Inventive 3 | Inventive 4 | Inventive 5 | Comparative 1 | Comparative 2 |
|---|---|---|---|---|---|---|---|
| Reactor 1 | | | | | | | |
| Ethylene Split (%) | 50 | 45 | 45 | 50 | 50 | 35 | 50 |
| Hydrogen to Reactor (ppm) | 1.1 | 0.91 | 1.1 | 1.78 | 1.68 | 0.85 | 1.97 |
| Solvent (kg/h) | 374 | 347 | 347 | 381 | 383 | 270 | 381 |
| Reactor Inlet Temperature (° C.) | 35 | 35 | 35 | 30 | 35 | 30 | 30 |
| Reactor Temperature (° C.) | 163 | 163 | 163 | 163 | 163 | 163 | 163 |
| Catalyst to Reactor (ppm) | 0.15 | 0.15 | 0.11 | 0.11 | 0.09 | 0.11 | 0.1 |
| Percent Ethylene Converted | 93 | 93.5 | 93.5 | 93.5 | 93.5 | 93.5 | 93.5 |
| Reactor 2 | | | | | | | |
| Ethylene Split (%) | 50 | 55 | 55 | 50 | 50 | 65 | 50 |
| Hydrogen to Reactor (ppm) | 40 | 45 | 40 | 40 | 45 | 12 | 15 |
| Solvent (kg/h) | 226 | 253 | 253 | 219 | 217 | 330 | 219 |
| Reactor Inlet Temperature (° C.) | 40 | 35 | 35 | 42 | 45 | 40 | 41 |
| Reactor Temperature (° C.) | 193 | 193 | 193 | 193 | 193 | 193 | 193 |

TABLE 1-continued

Pilot Plant Process Conditions and Resin Parameters for a HDPE (targeting a melt index, $I_2$ = ca. 2)

| Pilot Plant 2 MI HDPE | Inventive 1 | Inventive 2 | Inventive 3 | Inventive 4 | Inventive 5 | Comparative 1 | Comparative 2 |
|---|---|---|---|---|---|---|---|
| Catalyst to Reactor (ppm) | 0.5 | 0.55 | 0.24 | 0.24 | 0.29 | 0.12 | 0.15 |
| Percent Ethylene Converted | 85.2 | 84.0 | 84.0 | 81.9 | 81.7 | 82.1 | 82.0 |
| Whole Polymer Density (g/cc)-Overall | 0.965 | 0.966 | 0.965 | 0.967 | 0.967 | 0.963 | 0.963 |
| Melt Index (g/10 min)-Overall | 1.9 | 2.1 | 2.0 | 2.0 | 2.2 | 1.9 | 2.0 |
| Melt Flow Ratio-Overall | 44 | 59 | 56 | 45 | 38 | 47 | 37 |
| Mn-Overall | 8887 | 8044 | 9792 | 7437 | 10521 | 23536 | 21630 |
| Mw-Overall | 86068 | 80396 | 84166 | 86432 | 91284 | 97512 | 88991 |
| Mz-Overall | 261506 | 253136 | 274454 | 322204 | 248611 | 301957 | 225814 |
| Mw/Mn-Overall | 9.7 | 10.0 | 8.6 | 11.6 | 8.7 | 4.14 | 4.11 |
| wt % @ MW ≤ 20000-Overall | 47 | 53 | 49 | 49 | 45 | 24 | 28 |
| Reactor 1 | | | | | | | |
| wt % of Reactor 1 Polymer | 48 | 43 | 43 | 47 | 51 | 36 | 47 |
| Melt Index (g/10 min) | 0.13 | 0.10 | 0.09 | 0.12 | 0.13 | 0.05 | 0.15 |
| Mw | 167000 | 176000 | 181000 | 173000 | 167000 | 211000 | 159000 |
| Reactor 2 | | | | | | | |
| wt % of Reactor 2 Polymer | 52 | 57 | 57 | 53 | 49 | 64 | 53 |
| Melt Index (g/10 min) | 8250 | 8250 | 3000 | 12500 | 4750 | 60 | 150 |
| Mw | 9450 | 9450 | 12200 | 8480 | 11100 | 34000 | 27000 |

Part C.1: Blown Film

The HDPE compositions shown in Table 1 were used to prepare films on a blown film line manufactured by Gloucester Engineering Corporation of Gloucester, MA. The compositions contained 500 parts per million by weight (ppm) of a primary antioxidant (a hindered phenol, sold under the trademark IRGANOX® 1076), 500 ppm of a secondary antioxidant (a phopshite, sold under the trademark IRGAFHOS® 168) and a nucleating agent. The nucleating agent was purchased from Milliken (and is reported to be a combination of a) the calcium salt of HHPA and; b) zinc stearate, in a 2/1 weight ratio) and was added in an amount of 1200 ppm. The blown film line was fitted with a single screw extruder having a 2.5" (6.35 cm) diameter screw, a 24:1 length/diameter screw ratio and an annular die having a 4" (10.16 cm) diameter. The die gap was set at 35 mil. A conventional temperature profile for the extrusion of HDPE was used. A dual air ring was used for film cooling. Film thickness was 1.5 mils and a blow up ratio (BUR) of 2:1 was used to prepare the films.

Properties of the films are shown in the accompanying Tables.

TABLE 2

Barrier Data

| HDPE Resins | WVTR** (g/100 in²/day) | OTR** (cc/100 in²/day) |
|---|---|---|
| HDPE-1 MI (Comparative) | 0.0775 | 33 |
| Inventive 1 | 0.061 | 25 |
| Inventive 2 | 0.06 | 23 |
| Inventive 3 | 0.0454 | 25 |
| Inventive 4 | 0.0711 | 28 |
| Inventive 5 | 0.0637 | 28 |
| Comparative 1 | 0.0903 | 38 |
| Comparative 2 | 0.0867 | 37 |

The WVTR values shown in Table 2 are as measured for films that are 1.5 mils thick (i.e. they have not been "normalized" to a value that would be expected for a 1 mil thick film.) HDPE-1 MI is comparative—the melt index of this HDPE is 1.2 grams per 10 minutes which is too low for the compositions of this disclosure. HDPE-1 MI is a commercial product which has enjoyed commercial success for the preparation of barrier films that are used to package dry foods.

TABLE 3

Optical Data

| HDPE Resins | Haze** (%) | Gloss @ 45°** (%) |
|---|---|---|
| HDPE-1 MI (Comparative) | 32 | 28 |
| Inventive 1 | 22 | 41 |
| Inventive 2 | 24 | 38 |
| Inventive 3 | 27 | 30 |

TABLE 3-continued

Optical Data

| HDPE Resins | Haze** (%) | Gloss @ 45°** (%) |
|---|---|---|
| Inventive 4 | 28 | 29 |
| Inventive 5 | 34 | 24 |
| Comparative 1 | 28 | 25 |
| Comparative 2 | 26 | 30 |

**Haze and Gloss data for 1.5 mil blown films

Discussion of Optical Properties

Again, the values are reported "as-measured" for the 1.5 mil thick films (i.e. not "normalized") and HDPE-1 is comparative and made with a commercially available HDPE having a melt index of 1.2 grams per 10 minutes, which is too low for the compositions of this disclosure. Inventive films 1-5 were all shown to exhibit better "barrier" properties than the film made with HDPE-1 (in Table 2). The data in Table 3 show that inventive films 1-4 also exhibit better optical properties than the comparative film made from HDPE-1. Inventive films 1-4 also exhibit better optical properties than the two comparative films shown at the bottom of Table 3 which is interesting because comparatives 1-2 were also made with HDPE resins having a melt index of about 2 (as is required for the compositions of this disclosure). Inventive films 1-3 have especially good optical properties. Inventive compositions 1-3 all have an Mn of less than 10,000; an Mz of less than 300,000 and an Mw of less than 90,000.

Preparation of Multi-Layer Films

Multilayer films having three layers (A/B/C structure) were prepared in this example. The skin layers (A and C) were 25 weight % (each) of the total structure and were made with a conventional HDPE (prepared with a Zeigler Natta catalyst in a conventional solution polymerization reactor, having a melt index, $I_2$, of about 1 grams/10 minutes and a density of about 0.95 g/cc). The core layer (50 weight % of the total structure) was made with Inventive composition 1 or 2 from example 1. Barrier properties of the films are shown in Table 4.

TABLE 4

Multi-Layer Films

| HD PE Core Layer | 3-Layer Film Structure | |
|---|---|---|
| | Normalized WVTR (g · mil/100 in²/day) | Normalized OTR (cc · mil/100 in²/day) |
| HDPE-1 (Comparative) | 0.1669 | 72.9 |
| Inventive 1 | 0.1294 | 57.1 |
| Inventive 2 | 0.1545 | 62.1 |

TABLE 5

MD Secant Modulus at 1% Strain Data

| HDPE Resins | Secant Modulus (MPa) |
|---|---|
| HDPE-1 (Comparative) | 819 |
| Inventive 1 | 933 |
| Inventive 2 | 976 |
| Inventive 3 | 915 |

TABLE 5-continued

MD Secant Modulus at 1% Strain Data

| HDPE Resins | Secant Modulus (MPa) |
|---|---|
| Inventive 4 | 1212 |
| Inventive 5 | 832 |
| Comparative 1 | 1045 |
| Comparative 2 | 1076 |

Discussion of Modulus

It is desirable for HDPE films to have relatively high stiffness (as evidenced by having relatively high modulus values). The compositions of this disclosure have a higher melt index than the melt index of HDPE-1, and a higher melt index typically causes a lower stiffness/modulus. However, the data in Table 5 shows that the compositions of this disclosure also may be used to prepare films that have desirable stiffness/modulus. Secant modulus was measured in general accordance with ASTM D882.

Non-limiting embodiments of the present disclosure include the following:

Embodiment A. A polyethylene composition comprising at least two ethylene homopolymer blend components, wherein said composition has:
  (i) a density of from 0.96 to 0.97 g/cc;
  (ii) an Mw of from 75,000 to 95,000;
  (iii) an Mn of from 7,000 to 12,000;
  (iv) an Mz of from 200,000 to 325,000;
  (v) a molecular weight distribution, Mw/Mn of from 6 to 12;
  (vii) a melt index, $I_2$, as determined by ASTM D1238 at 190° C., using a 2.16 kilogram load, of from 1.5 to 2.8 grams per 10 minutes; and further characterized in that;
  (viii) from 25 to 55 weight % of said composition has a molecular weight of less than or equal to 20,000;
wherein said composition comprises a first blend component containing 45 to 60 weight % of said composition and a second blend component containing from 55 to 40 weight % of said composition, wherein said first blend component has:
  A1) an Mw/Mn of from 1.8 to 2.5; and
  A2) a melt index, $I_2$, as determined by ASTM D1238 at 190° C., using a 2.16 kilogram load, of from 3,000 to 25,000 grams per 10 minutes; and
wherein said second blend component has:
  B1) an Mw/Mn of from 1.8 to 2.5; and
  B2) melt index, $I_2$, as determined by ASTM D1238 at 190° C., using a 2.16 kilogram load, of from 0.05 to 0.5 grams per 10 minutes.

Embodiment B. The polyethylene composition of Embodiment A wherein said Mn is from 7,000 to 10,000.

Embodiment C. The polyethylene composition of Embodiment A or B wherein said Mz is from 200,000 to 300,000.

Embodiment D. The polyethylene composition of Embodiment A, B or C wherein said first blend component has a melt index, $I_2$, as determined by ASTM D1238 at 190° C., using a 2.16 kilogram load, of from 3,000 to 8,500 grams per 10 minutes.

Embodiment E. The polyethylene composition of Embodiment A, B, C or D wherein at least 40 weight % of said composition has a molecular weight of less than 20,000.

Embodiment F. The polyethylene composition of Embodiment A, B, C, D or E wherein at least 99 weight % of said composition has a molecular weight of less than or equal to 900,000.

Embodiment G. The polyethylene composition of Embodiment A, B, C, D, E or F comprising a nucleating agent.

Embodiment H. The polyethylene composition of Embodiment G wherein the nucleating agent comprises a salt of a dicarboxylic acid.

Embodiment I. The polyethylene composition of Embodiment G wherein the nucleating agent comprises a calcium salt of hexahydrophthalic acid.

Embodiment J. A film made from the polyethylene composition of Embodiment A, B, C, D, E, F, G, H or I.

Embodiment K. A film made from the polyethylene composition of Embodiment A, B, C, D, E, F, G, H or I having a haze value of less than 30%.

Embodiment L. A process to prepare the polyethylene composition of Embodiment A said process comprising contacting at least one single site polymerization catalyst system with ethylene under polymerization conditions for said ethylene in at least two polymerization reactors, including a first polymerization reactor and a second polymerization reactor, and blending together the polyethylene produced in each polymerization reactor, wherein hydrogen is added to said first polymerization reactor so as to provide a concentration of from 0.5 to 2 ppm in said first polymerization reactor and wherein hydrogen is added to second polymerization reactor so as to provide a hydrogen concentration of from 35 to 55 ppm in said second polymerization reactor.

Embodiment M. The process according to Embodiment L wherein said polymerization conditions are solution polymerization conditions.

Embodiment N. The process according to Embodiment M wherein said at least two polymerization reactors are operated such that a temperature difference of at least 30° C. exists between said at least two polymerization reactors.

INDUSTRIAL APPLICABILITY

Provided is a polyethylene homopolymer composition which can be used to prepare polymer films having a good balance of optical properties and resistance to moisture transmission.

The invention claimed is:

1. A polyethylene composition comprising at least two ethylene homopolymer blend components, wherein said composition has:
   (i) a density of from 0.96 to 0.97 g/cc;
   (ii) an Mw of from 75,000 to 95,000;
   (iii) an Mn of from 7000 to 12,000;
   (iv) an Mz of from 200,000 to 325,000;
   (v) a molecular weight distribution, Mw/Mn of from 6 to 12;
   (vii) a melt index, $I_2$, as determined by ASTM D1238 at 190° C., using a 2.16 kilogram load, of from 1.5 to 2.8 grams per 10 minutes; and further characterized in that
   (viii) from 25 to 55 weight % of said composition has a molecular weight of less than or equal to 20,000;
   wherein said composition comprises a first blend component containing 45 to 60 weight % of said composition and a second blend component containing from 55 to 40 weight % of said composition, wherein said first blend component has:
   A1) an Mw/Mn of from 1.8 to 2.5; and
   A2) a melt index, $I_2$, as determined by ASTM D1238 at 190° C., using a 2.16 kilogram load, of from 3,000 to 25,000 grams per 10 minutes; and
   wherein said second blend component has:
   B1) an Mw/Mn of from 1.8 to 2.5; and
   B2) a melt index, $I_2$, as determined by ASTM D1238 at 190° C., using a 2.16 kilogram load, of from 0.05 to 0.5 grams per 10 minutes; and
   wherein the first and second blend components are polymers that are the product of a polymerization process in which only ethylene is deliberately present as a polymerizable monomer.

2. The polyethylene composition of claim 1, wherein said Mn is from 7,000 to 10,000.

3. The polyethylene composition of claim 2, wherein said Mz is from 200,000 to 300,000.

4. The polyethylene composition of claim 1, wherein said first blend component has a melt index, $I_2$, as determined by ASTM D1238 at 190° C., using a 2.16 kilogram load, of from 3,000 to 8,500 grams per 10 minutes.

5. The polyethylene composition of claim 1, wherein 40 to 55 weight % of said composition has a molecular weight of less than 20,000.

6. The polyethylene composition of claim 1, wherein at least 99 weight % of said composition has a molecular weight of less than or equal to 900,000.

7. The polyethylene composition of claim 1 further comprising a nucleating agent.

8. The polyethylene composition of claim 7, wherein the nucleating agent comprises a salt of a dicarboxylic acid.

9. The polyethylene composition of claim 7, wherein the nucleating agent comprises a calcium salt of hexahydrophthalic acid.

10. A film made from the polyethylene composition of claim 1.

11. A film made from the polyethylene composition of claim 1 having a haze of less than 30%.

12. A film made from the polyethylene composition of claim 3 having a haze of less than 30%.

13. A process to prepare the polyethylene composition of claim 1, said process comprising contacting at least one single site polymerization catalyst system with ethylene under polymerization conditions for said ethylene in at least two polymerization reactors, including a first polymerization reactor and a second polymerization reactor, and blending together the polyethylene produced in each polymerization reactor, wherein hydrogen is added to said first polymerization reactor so as to provide a concentration of from 0.5 to 2 ppm in said first polymerization reactor and wherein hydrogen is added to second polymerization reactor so as to provide a hydrogen concentration of from 35 to 55 ppm in said second polymerization reactor.

14. The process according to claim 13, wherein said polymerization conditions are solution polymerization conditions.

15. The process according to claim 14, wherein said at least two polymerization reactors are operated such that a temperature difference of at least 30° C. exists between said at least two polymerization reactors.

* * * * *